April 11, 1939.　　C. E. ARMSTRONG　　2,153,859
AUTOMATIC TEMPERATURE REGULATING SYSTEM
Filed Jan. 28, 1936　　2 Sheets-Sheet 1

CHARLES E. ARMSTRONG.
INVENTOR

James O'Lirnan
ATTORNEY

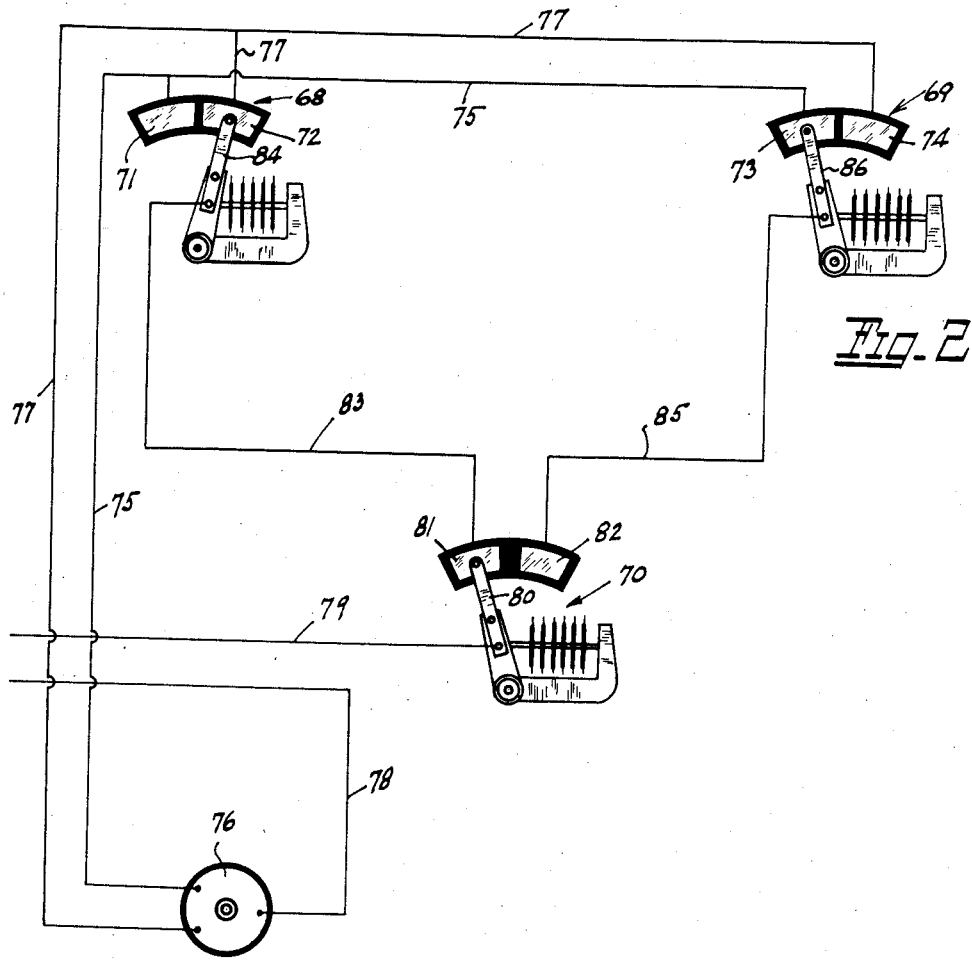

Patented Apr. 11, 1939

2,153,859

UNITED STATES PATENT OFFICE 2,153,859

AUTOMATIC TEMPERATURE REGULATING SYSTEM

Charles E. Armstrong, Portland, Oreg., assignor to Armstrong Heat Control Company, Corvallis, Oreg.

Application January 28, 1936, Serial No. 61,116

2 Claims. (Cl. 236—91)

This invention relates to improvements in temperature regulating and heat controlling systems, and is particularly adapted to start and stop the operating cycles of any automatic firing devices, such as oil burners, coal stokers and the like, as well as the opening and closing of electrically operated steam valves. One of the principal objects of the invention is to provide a plurality of thermostats disposed at various locations within a room, a building or a space to be heated, and electrically interconnected in such a way that they stop the heat supplying means before the space being heated arrives at a desired or predetermined temperature, the stopping is timed to allow the overrun of heat to bring the temperature up to the desired point.

In a reverse condition, when the temperature within the space is falling, this control will start the heat supplying means before the temperature within the room falls back to the desired point. In other words, this control prevents the overrunning, as well as the underrunning, of the temperature which would otherwise occur, and does occur in conventional heat controlling systems, where only a single thermostat is used to turn the heat on and off only at the time the thermostat is actuated by the temperature surrounding it.

Another object is to eliminate the uncomfortable period existing in a space being heated, between the time heat has been shut off, or stopped generating, and when it comes back on again. Even though, during this interval, the temperature may remain at the desired point at the location of the thermostat while the temperature at the floor and at the registers and radiators and windows may fall below the desired temperature.

These and other objects will appear as my invention is more fully hereinafter described in the following specification, illustrated in the accompanying drawings and finally pointed out in the appended claims.

In the drawings:

Figure 2 is a view somewhat similar to Figure 1, but showing the thermostats divided and arranged in different locations.

Figure 1:
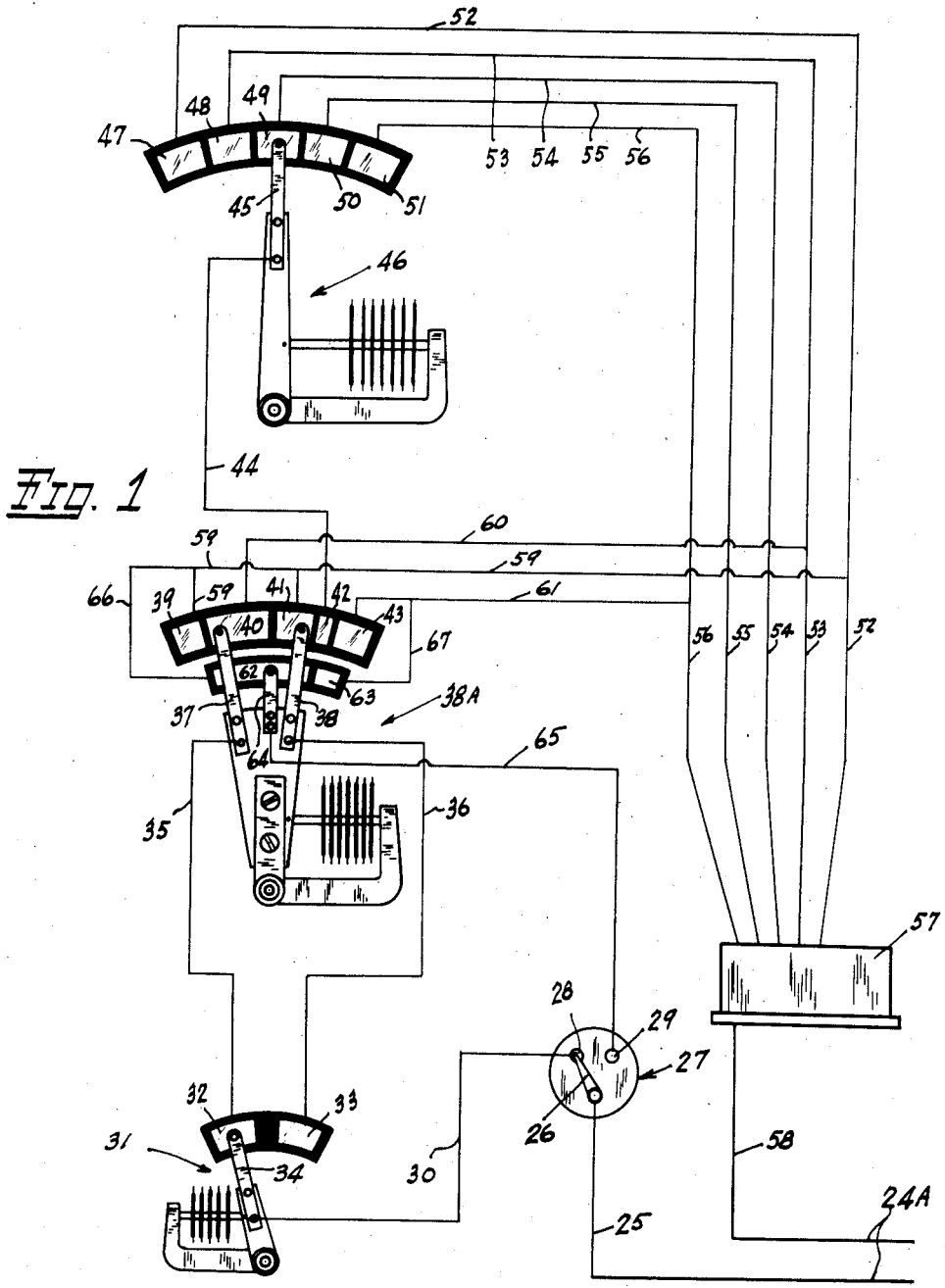
Figure 1 illustrates a plurality of thermostats, a time switch and a steam-valve operating mechanism embraced within a series of electrical circuits.

Referring now more particularly to the drawings:

In Figure 1, I provide a main circuit 24A with one wire 25 thereof connecting with a switch blade 26 in a time switch generally indicated at 27, and which is provided with a pair of contacts 28 and 29. From the contact 28, I extend a wire 30 to a thermostatic switch generally indicated at 31 which is provided with a pair of contacts 32 and 33. A switch blade 34 is adapted to swing into contact with either of the contacts 32 or 33, and is connected with the wire 30 from the time switch. From the contacts 32 and 33, I extend a pair of wires 35 and 36 to a pair of switch blades 37 and 38 carried by a thermostat 38A. The switch blades 37 and 38 are adapted to contact segments or contacts 39, 40, 41, 42 and 43. From the contact 42, I extend a wire 44 to a switch blade 45 of another thermostat generally indicated at 46, and preferably disposed on the exterior of a building. This thermostat comprises a plurality of contacts 47, 48, 49, 50 and 51. From these contacts, I extend wires 52, 53, 54, 55 and 56, respectively. These wires connect with any approved form of actuating means 57 for a series of steam valves in a steam supply line. The valve actuating means may be a motor whose intermittent operation opens and closes the valves. For example, operation of the motor for a certain period of time may open all the valves. Then further operation for a like period may close all the valves. So also may the valves be opened and closed individually by operating the motor for predetermined periods of time. The valves, of course, when opened will remain so until the motor is operated again to close them. The opposite side of the steam valve actuating means is connected by wire 58 with the main circuit 24.

The contact 39 of the thermostat 38A connects by wire 59 with the wire 52. The contact 40 connects with the wire 53 by means of a wire 60 and the contact 43 connects with wire 56 by means of a wire 61. The contact 41 connects with the wire 59.

The contact 28 of the switch 27 is for day time operation of the control system, and contact 29 is for the night operation thereof. As shown, one wire 25 of the main circuit 24 extends through the time switch and into switch 31. The current by means of the blade 34 passes through the switch 31, through either of the contacts 32, 33, wires 35 or 36 and into either of the switch blades 37 and 38. In the position of the switch 31, as shown, the radiator is cold, or, at least, is requiring steam, therefore, the current passing through part of the circuit, just described, into switch blade 37 continues on from there through contact 40, wire 60 and into wire 53, thence into the steam valve actuating mechanism. For convenience in describing the purpose of the various wires interconnecting the thermostat 46 with the steam valve actuating mechanism, it should now be pointed out that a circuit closed through wire 52 will close all the valves, a circuit closed through wire 53 will open only one of the valves and a circuit completed through wire 56 will open all the valves. With all the valves open, of course, a full head of steam will be supplied to the radiators and a supply will be, correspondingly, decreased with the closing of certain of the valves.

As previously pointed out, the thermostat 46 is preferably disposed on the exterior of the building to be influenced by the rise and fall of outside temperature. A fall in temperature on the exterior of the building necessitates more steam in the supply line within the building, and, accordingly, if the temperature rises, less steam is required. The thermostat 46 is provided with a plurality of contacts, as aforesaid, to represent various degrees through which the outside temperature will fluctuate, and they are electrically interconnected by means of the wires 52 to 56, as aforesaid, with the steam valve actuating means so that the valves may be dealt with in accordance with the requirements caused by the outside temperature to supply more or less steam into the system. By this means, the amount of steam required within the system is automatically supplied by the outside thermostat 46 and when the required amount of steam has entered the system, it will be, thereafter, dealt with or controlled by the action of the switch 31 and the thermostat 38A.

The contact 42, of the thermostat 38A, is what might be termed a neutral zone insofar as the controlling effect of the thermostat is concerned when the blade 38 is in contact with contact 42, since this contact takes the control away from the thermostat and transfers it to the outside thermostat 46 by completing a circuit from the blade 38 of thermostat 38A through wire 44 up to the outside thermostat.

Incorporated in the thermostat 38A is a pair of supplemental contacts 62 and 63 representing a zone of night operation through which a blade 64 may pass in accordance with temperature fluctuations. The blade 64 is mounted upon, and moves with the supporting means for the blades 37 and 38. The blade 64 connects with contact 29 of the time switch 27 by means of a wire 65, so that the main line circuit may pass directly through either of the contacts 62 and 63, according to the setting of the blade 64, and deal directly with the steam valve actuating means 57 to open or close all of the valves. The contact 62 is connected with wire 59 by wire 66, and the contact 63 is connected with the wire 61 by a wire 67. The zone represented by contact 62 prescribes the normal range within which the blade 64 will move in normal temperature conditions during the night. When in this zone, all valves are closed and the steam supply to the radiators, or heating units, is shut off. If a sufficient drop in temperature occurs to move the blade 64 over onto contact 63, a circuit through wires 67 and 61 into wire 56 will be completed to start the steam valve actuating means in operation which, of course, will supply steam to the radiators.

The form of the invention illustrated in Figure 2 comprises a plurality of contacts divided into two groups 68 and 69 so that they may be disposed at different locations in a space to be heated, for example, in a room one group may be placed on a wall at one side of the room, while the other may be placed at or near a window. These two groups are electrically connected with a thermostatic switch 70. The thermostat 68 is provided with two contacts 71 and 72 and corresponding contacts 73 and 74 are provided in the thermostat or group 69. The contacts 71 and 73 are connected by a wire 75 which continues on and connects with any approved form of relay, or the like, (not shown) for opening the motor circuit, or said wire 75 may connect with an electrically actuated means for closing the valve. The contacts 72 and 74 are interconnected by a wire 77 which also continues on to the motor 76. The opposite side of the motor is connected with one wire 78 of a main circuit extending to any convenient source of supply. The other wire 79 of the main circuit connects with a blade 80 of the switch 70. The blade is adapted to contact either one of a pair of contacts 81 and 82 in the switch 70. From the contact 81, I extend a wire 83 which connects with a blade 84 in the thermostat 68. From the opposite contact 82 of the switch 70, I extend a wire 85 which connects with a blade 86 adapted to move into contact with either of the contacts 73 and 74 in the thermostat 69. When the groups are arranged, as aforesaid, for example, with the thermostat 68 on a wall and the thermostat 69 at or near a window, the thermostat 69 will be the first to be influenced by any effective change in temperature caused either by heat losses, due to a drop in temperature on the exterior of the building, or, perhaps, a cooling of the radiator from which the steam has been previously cut off by the action of the switch 70. In a case of this kind, of course, the blade 80 of the switch 70 will have moved over onto contact 82 thereby extending the main circuit 79 through wire 85, through blade 86, and by reason of the movement of the blade 86 over onto contact 74, said main circuit will be extended through wire 77, through the motor, as aforesaid, and into the main line through wire 78. Thus, it will be seen that the operating circuit for the burner motor has been closed which, of course, will start it in operation. When heat is again supplied to the radiator, the blade 80 of the switch 70 will move back over onto contact 81 so that the main circuit will be directed through wires 79 and 83 into the thermostat 68, whose blade 84 will determine by its position whether the burner motor should be started or stopped, in accordance with the prevailing temperature at the wall.

While I have shown my various thermostats and switches electrically interconnected with each other and with the heat actuating means, it is to be understood that these various elements may be interconnected in such a way that any other form of energy may be transmitted from one to the other, such, for instance, as compressed air or the like. In substituting compressed air for the electrical energy it would only be necessary to substitute tubes or pipes for the wires, as illustrated. For example, in Figure 2 the switch 70, thermostats 68 and 69 instead of actuating electrical switches could be adapted to manipulate valves for directing compressed air or the like through air lines thermostatically selected by the temperature or temperatures influencing the thermostats.

While I have shown a particular form of embodiment of my invention, I am aware that many minor changes therein will readily suggest themselves to others skilled in the art without departing from the spirit and scope of the invention. What I claim as new and desire to protect by Letters Patent is:

1. An automatic heat regulating system comprising a plurality of thermostats, one of said thermostats disposed in the vicinity of a heating unit within a space to be heated, another of said thermostats disposed within the space to be heated at a point remote from the heating unit, another of said thermostats disposed on the exterior of the space to be heated, all of said thermostats being electrically interconnected with each other and with a means for actuating a heat supplying means, the thermostat on the exterior of the space to be heated being adapted to actuate the heat supplying means when said inside thermostat is satisfied, the thermostat in the vicinity of the heating unit being adapted under the influence of the temperature of the heating unit to direct the circuit embracing said heat actuating means through said space thermostat and said thermostat in the vicinity of the heating unit having no control of the heat actuating means independent of the other of said thermostats.

2. An automatic heat regulating system comprising a plurality of thermostatically actuated switches all electrically interconnected with each other and with means for actuating a heat supplying means, one of said switches attached to and influenced by the temperature of any part of the heat supplying system but having no direct control of the heat supply means, the other of said switches being disposed at points remote from said first mentioned switch, said first mentioned switch under the influence of the temperature surrounding it being adapted to direct a circuit through certain of the other of said switches for actuating said heat supplying means in accordance with the temperature requirements of said remotely disposed switches.

CHARLES E. ARMSTRONG.